United States Patent [19]
Goodenough

[11] 3,721,629
[45] March 20, 1973

[54] METHOD AND COMPOSITION FOR REMOVING IRON STAINS FROM PORCELAIN

[75] Inventor: Robert D. Goodenough, Midland, Mich.

[73] Assignee: The Dow Chemical Company, Midland, Mich.

[22] Filed: May 21, 1969

[21] Appl. No.: 826,389

[52] U.S. Cl. .................. 252/105, 252/106, 252/136, 252/142, 252/147, 134/3
[51] Int. Cl. ............................................. C11d 7/54
[58] Field of Search......252/105, 106, 188, 136, 146, 252/147; 134/3

[56] References Cited

UNITED STATES PATENTS

| | | | |
|---|---|---|---|
| 3,173,875 | 3/1965 | Wegst et al. | 252/105 |
| 3,262,883 | 7/1966 | Fisher | 252/105 |

OTHER PUBLICATIONS

"Chemistry of the Metal Chelate Compounds," Martell et al., 1956 page 511

*Primary Examiner*—Mayer Weinblatt
*Attorney*—Griswold & Burdick, C. E. Rehberg and J. Roger Lochhead

[57] ABSTRACT

A solid or liquid composition for removing iron from stains on hard, smooth surfaces, comprising (a) a sufficient amount of a hydrogen ion source to produce a pH of between about 1.5 and 4.5 under operating conditions; (b) an amount of a chelate agent sufficient to couple the $Fe^{+++}$ present in the stain, said chelate agent having a positive formation constant for $Fe^{+++}$ in the pH range of 1.5 to 4.5; (c) a soluble $Fe^{++}$ salt in an amount less than equimolar with respect to the chelate agent; and, optionally, agents capable of producing effervescent gases; disinfectants; detergents; dyes; binders; solvents; perfumes; etc.

9 Claims, 1 Drawing Figure

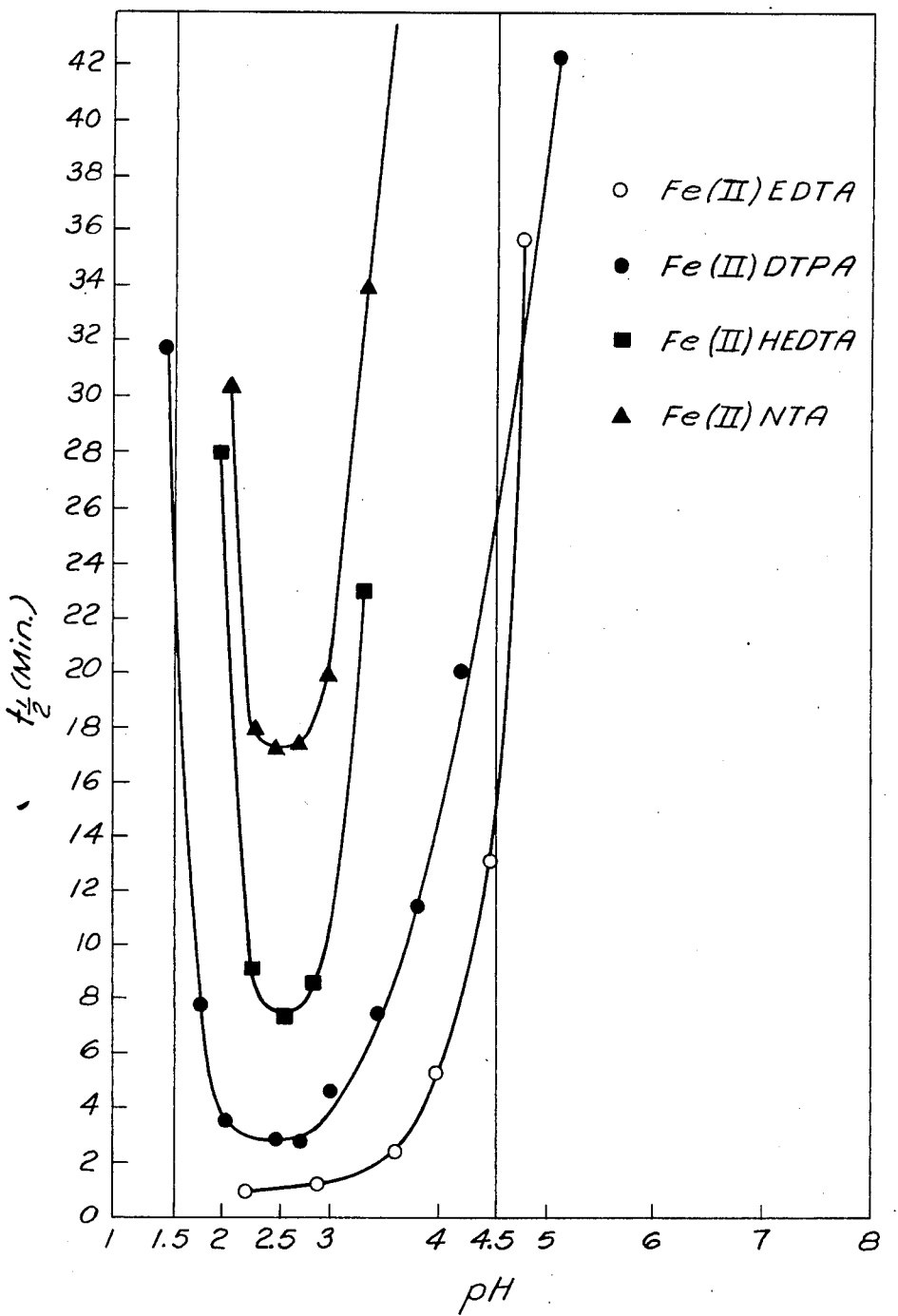

METHOD AND COMPOSITION FOR REMOVING IRON STAINS FROM PORCELAIN

BACKGROUND OF THE INVENTION

Hard surfaces, as are typically found in the home, are easily stained when contacted with water containing $Fe^{++}$ salts. As the water dries, the $Fe^{++}$ is air oxidized to $Fe^{+++}$, which is responsible for unsightly, and tenacious, stains.

The prior art has customarily applied acidic compositions to remove such iron stains. However, in order for the removal to be satisfactory, high concentrations of strong acids, such as sulfuric acid, have been necessary. Naturally, this required numerous precautions while using the cleanser, and necessitated certain restrictions in its use.

U.S. Pat. No. 3,173,875 teaches the improvement of using a soluble ferrous salt along with an acid in order to allow $Fe^{+++}$ removal at a higher and safer pH.

SUMMARY OF THE INVENTION

The invention comprises an improved composition and method for removing $Fe^{+++}$ from stains on hard surfaces, such as ceramic, concrete, porcelain, glass, metal surfaces and the like, based on the discovery that utilizing chelating agents and controlling pH yield unexpectedly good $Fe^{+++}$ removal results.

More particularly, the composition comprises (a) a sufficient amount of a hydrogen ion source to produce a pH of between about 1.5 and 4.5 under operating conditions; (b) a sufficient amount of a chelate agent to couple the $Fe^{+++}$ present in the stain, said chelate agent having a positive formation constant for $Fe^{+++}$ in the pH range of about 1.5 to 4.5; and, (c) a soluble $Fe^{++}$ salt in an amount less than equimolar with respect to the amount of the chelate agent present.

The composition may be a liquid or a solid, and the invention may be utilized to clean household hard surfaces, such as lavatories, toilet bowls, floors, tile, etc.

GENERAL DESCRIPTION OF THE INVENTION

The drawing illustrates the criticality of pH regarding the ability of an acid-$Fe^{++}$ salt-chelate agent system to remove $Fe^{+++}$ present in stains. The procedure for the test is given in Example 2. Note that at a pH of between about 1.5 and about 4.5, the ability of the system to remove $Fe^{+++}$ present in stains is markedly enhanced with respect to the time necessary to remove such stains.

The solid or liquid composition of the present invention may suitably comprise 1.0 to 50.0 weight percent of a hydrogen ion source which produces a pH of between 1.5 and 4.5 under operating conditions, 2.0 to 8.0 weight percent of a water soluble $Fe^{++}$ salt and 14.0 to 22.0 weight percent of a chelate agent that has a positive formation constant for $Fe^{+++}$ in the pH range of 1.5 to 4.5. Optionally, agents capable of producing effervescent gases and disinfectants, detergents, dyes, binders, solvents, perfumes, etc. may be present in suitable amounts.

The hydrogen ion source may properly be an acid or an acid salt. A solid acid or acid salt is required for the solid form of cleanser, while a liquid or solid acid or acid salt may be used for the liquid form of cleanser. Mineral acids, such as sulfuric and hydrochloric are suitable liquid acids, as are nitric, phosphoric and hydrobromic. Alkali metal bisulfates and orthophosphates are suitable solid acid salts. Included among the above are $NaHO_4$, $LiHSO_4$, $KHSO_4$ and $NaH_2PO_4$. Sulfamic and meta phosphoric acids are examples of suitable solid acids.

Water soluble ferrous salts, mixed salts or double salts are suitable for this invention. Examples include ferrous sulfate, ferrous chloride, ferrous acetate, ferrous citrate, ferrous bromide, ferrous sulfamate, $FeSO_4 \cdot H_2O + NaHSO_4 \cdot H_2O$ and $FeSO_4 \cdot Na_2SO_4 \cdot 4H_2O$.

The free acids and the salts of chelate agents which (a) demonstrate a solubility of at least 0.1 weight percent, and which (b) demonstrate a positive formation constant (over the protonated form) for $Fe^{+++}$, in the pH range of 1.5 to 4.5, are suitable for the method and composition of the invention. Formation constants and the method of determining same are discussed on pages 190–192, Martell and Calvin, "Chemistry of Metal Chelate Compounds", Prentice Hall, Inc., New York, N. Y. (1952).

A preferred group of chelate agents are the aminocarboxylates of the formula

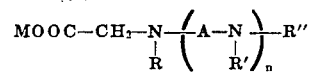

wherein M is H, an alkali metal, ammonium or one to four carbon atoms alkyl-ammonium; R—, R'— and R"— are independently $-CH_2CH_2OH$, $-CH_2COOM$ or $-CH_2CH_2COOM$; —A— is an alkylene radical of two or three carbon atoms; and $n$ is an integer of from 0 to 4.

Examples of the above preferred group include diethylenetriaminepentaacetic acid (DTPA), ethylenediaminetetraacetic acid (EDTA), nitrilotriacetic acid (NTA), N-hydroxyethylenediaminetriacetic acid (HEDTA), and the Li, Na, K and ammonium salts thereof, such as $Na_2H_2$ EDTA, $NaH_3$ EDTA and $Na_3$ NTA.

The solid form of the invention has the advantages of being stable and easily handled, and is, therefore, the preferred form. The $Fe^{++}$ chelate forms in situ when using the solid. This embodiment can suitably include:

A. 35 to 55 weight percent of a solid acid or acid salt as defined above;

B. 20 to 30 weight percent of a solid carbonate or bicarbonate of an alkali or alkaline earth metal capable of producing a soluble salt of (A) above in the pH range of 1.5 to 4.5, which produces, in contact with said hydrogen ion source, an effervescent gas;

C. 15 to 25 weight percent of a chelate agent as defined above;

D. 5 to 10 weight percent of a ferrous salt as defined above; and

E. Disinfectants, detergents, lubricants, binders, perfumes and dyes in amounts necessary to fulfill the desired functions.

More particularly, the solid form of the composition may suitably contain the following components:

A. 40 to 50 weight percent of a solid acid or acid salt, such as an alkali metal bisulfate or orthophosphate, or sulfamic acid;

B. 22 to 26 weight percent of a solid alkali or alkaline earth carbonate or bicarbonate, such as Na, K, Li, Mg or ammonium carbonate or bicarbonate, or $FeCO_3$;

C. 17 to 21 weight percent of one of the above defined chelate agents;

D. 5 to 7 weight percent of $FeSO_4 \cdot H_2O + NaHSO_4 \cdot H_2O$, $FeSO_4 \cdot Na_2SO_4 \cdot 4H_2O$, $FeCO_3$ or $Fe(SO_3-NH_2)_2$;

E. 2 to 4 weight percent of a disinfectant that is a solid and has a pKa greater than about 4.5, such as o-phenylphenol, 3,4,5-tribromosalicylanilide;

F. 0.2 to 0.3 weight percent of an anionic or nonionic surfactant or a mixture thereof, that is solid or liquid, but not contained in a water or short chain aliphatic alcohol base, and is stable in the operative pH range, such as sodium lauryl sulfate or the Na salt of dodecylated oxydibenzene disulfonate;

G. 1 to 2 weight percent of a perfume that is a solid or liquid, such as an oil, but not one that is contained in a water or short chain aliphatic alcohol base; and H. 0.01 to 0.02 weight percent of a dye that is stable in the pH range of about 1.5 to 4.5.

The embodiment of the invention wherein the form is liquid can suitably include:

1. 1.5 to 2.5 weight percent of a mineral acid as defined above;
2. 10 to 22 weight percent of a chelate agent as defined above;
3. 1 to 3.5 weight percent of a ferrous salt as defined above;
4. 3 to 6 weight percent of a reducing agent capable of reducing $Fe^{+++}$ to $Fe^{++}$ in the pH range of 1.5 to 4.5 and, thereby, stabilizing the liquid form from $Fe^{++}$ oxidation before use;
5. 30 to 60 weight percent of an aliphatic short chain alcohol, i.e., one to about four carbons, as a solvent; and
6. Disinfectants, detergents, lubricants, etc. in amounts necessary to fulfill the desired functions.

More particularly, the liquid form of the composition may suitably contain the following components:

A. 1.7 to 2.2 weight percent of a mineral acid, such as hydrochloric, sulfuric, sulfamic hydrobromic or phosphoric acid;

B. 14 to 18 weight percent of one of the above defined chelate agents;

C. 2 to 3 weight percent of a ferrous salt, such as ferrous sulfate, ferrous chloride, ferrous acetate, ferrous citrate, ferrous bromide, or ferrous sulfamate;

D. 4 to 5 weight percent of a reducing agent, such as sodium hydrosulfite, hydroxylamine hydrochloride, sodium hypophosphite;

E. 40 to 50 weight percent of a short chain aliphatic alcohol, such as methanol, ethanol, i-propanol, n-propanol or n-butanol;

F. 1 to 2 weight percent of a detergent, or mixtures thereof, such as are used for the solid form;

G. 1 to 2 weight percent of an anionic phenolic disinfectant, either solid and liquid, such as o-phenylphenol, 3,4,5-tribromosalicylanilide; and H. Perfumes and dyes such as those used in the liquid embodiment and in similar amounts.

SPECIFIC EMBODIMENTS

Example 1

The iron staining procedure practiced in U.S. Pat. No. 3,173,875 was used to test examples of the compositions of the instant invention. A 5 percent ferric chloride solution was applied to a glazed porcelain wall tile and baked on at 130°C. for 2 hours. A very tenacious rust colored stain resulted, which could not be rubbed off with a wet cloth.

The ability of any formulation to remove such a stain was tested by (1) placing a stained tile in a beaker containing three liters of water and adding the solid formulation or (2) placing one drop of the liquid formulation on the stain in the case of the liquid formulation. The time necessary to completely remove the stain from the time of first contact was then noted.

An example was formulated as follows:
- 30.00 gm. $NaHSO_4$
- 18.82 gm. $NaHCO_3$
- 15.00 gm. $Na_2H_2$ EDTA
- 10.98 gm. $NaHSO_4 \cdot H_2O - FeSO_4 \cdot H_2O$
- 2.40 gm. o-Phenylphenol
- 0.75 gm. Perfume
- 0.19 gm. Na salt of dodecylated oxibenzene disulfonate
- 0.01 gm. Turquoise dye (an acid stable copper phthalocyanine dye)

This formulation was dry blended and compacted into a tablet at a pressure of 3,000 p.s.i. It was then placed into the beaker as taught above, and, after effervescing vigorously, removed the iron stain in less than 3 minutes.

A further example (liquid) was formulated as follows:
- 7.00 gm. $Na_2H_2PO_2 \cdot H_2O$
- 71.60 gm. $H_2O$
- 24.30 gm. $Na_5$ DTPA
- 2.80 gm. $H_2SO_4$ (Conc.)
- 6.80 gm. $FeSO_4 - 7H_2O$
- 36.00 gm. Methanol
- 0.75 gm. Na salt of dodecylated dibenzene disulfonate
- 0.75 gm. o-Phenylphenol This formulation was tested as a liquid as described above, the one drop cleaning the iron stain in the area of tile contacted in less than 2 minutes.

Example 2

An experiment was carried out to determine the criticality of pH on the ability of the composition of this invention to remove $Fe^{+++}$ stains.

The stained material was prepared by completely wetting flux calcined diatomaceous earth with 0.3 M $FeCl_3$ which contained $Fe^{59}$ as a radioactive tracer. $NH_3$ was then blown through the bed to precipitate hydrous $Fe_2O_3$, the sample dried at 110°C., washed several times with deionized water and aged for 2 ½ weeks in water at 80°C. Analysis showed that one gram of the supported ferric oxide contained about 0.6 millimoles of iron.

About 30 mg. of supported ferric oxide was treated in each run. The indicated solvent (25°C.) was pumped through the bed at about 10 ml./min., and standard radioactive iron tracing techniques were used to rate of decay of activity, and, hence, the rate of dissolution of $Fe_2O_3$ could be easily determined.

The results are expressed as the half time ($t \frac{1}{2}$) of the dissolution reaction, i.e., the time required to reduce the activity of the sample to half its initial volume. As a basis for comparison, it should be noted that the half time of dissolution of the $Fe_2O_3$ sample employed in these experiments was found to be 24 minutes in 3M HCl.

The results are given in FIG. 1.

I claim:

1. An improved composition for removing $Fe^{+++}$ from stains comprising:
   A. A sufficient amount of a hydrogen ion source to produce a pH of between about 1.5 and 4.5 under operating conditions;
   B. A sufficient amount of a chelate agent to couple the $Fe^{+++}$ present in the stain, said chelate agent having a positive formation constant for $Fe^{+++}$ in the pH range of about 1.5 to 4.5; and
   C. A soluble $Fe^{++}$ salt in an amount less than equimolar with respect to the amount of the chelate agent present.

2. The composition of claim 1 wherein the amount of acid is 1.0 to 50.0 weight percent, the amount of $Fe^{++}$ salt is 2.0 to 8.0 weight percent, and the amount of chelate agent is 14.0 to 22.0 weight percent.

3. The composition of claim 1 which comprises:
   A. 35 to 55 weight percent of component (A) in the form of a solid acid or acid salt;
   B. 15 to 25 weight percent of component (B);
   C. 5 to 10 weight percent of component (C); and further,
   D. 20 to 30 weight percent of a solid carbonate or bicarbonate of an alkali metal, an alkaline earth metal or ammonium, capable of producing a soluble salt of (A) above in the pH range of 1.5 to 4.5 and which produces, in contact with said H ion source, an effervescent gas.

4. The composition of claim 1 which comprises:
   A. 1.5 to 2.5 weight percent of component (A) in the form of a mineral acid;
   B. 10 to 22 weight percent of component (B);
   C. 1 to 3.5 weight percent of component (C);
   D. 3 to 6 weight percent of a reducing agent capable of reducing $Fe^{+++}$ to $Fe^{++}$ in the pH range of about 1.5 to 4.5;
   E. 30 to 60 weight percent of an aliphatic short chain alcohol of one to about four carbon atoms.

5. The composition of claim 1 wherein the chelate agent is diethylenetriaminepentaacetic acid; ethylenediaminetetraacetic acid; nitrilotriacetic acid; N-hydroxyethylenediaminetriacetic acid; or the Li, Na, K or $NH_4$ salts thereof.

6. The composition of claim 3 which comprises:
   A. 40 to 50 weight percent of an alkali metal bisulfate, alkali metal orthophosphate, alkali metal metaphosphate or sulfamic acid;
   B. 17 to 21 weight percent of component (B);
   C. 5 to 7 weight percent of $FeSO_4 \cdot H_2O + NaHSO_4 \cdot H_2O$; $FeSO_4 \cdot Na_2SO_4 \cdot 4H_2O$; $FeCO_3$; or $Fe(SO_3-NH_2)_2$;
   D. 22 to 26 weight percent of Na, K, Li, Mg or ammonium carbonate or bicarbonate, or $FeCO_3$.

7. The composition of claim 4 which comprises:
   A. 1.7 to 2.2 weight percent of CHI, $H_2SO_4$, HBr or $H_3PO_4$;
   B. 14 to 18 weight percent of component (B);
   C. 2 to 3 weight percent of ferrous sulfate, chloride, acetate, citrate, bromide or sulfamate;
   D. 4 to 5 weight percent of sodium hydrosulfite, hydroxylamine hydrochloride or sodium hypophosphite;
   E. 40 to 50 weight percent of methanol, ethanol, i-propanol, n-propanol or n-butanol.

8. An improved process for removing $Fe^{+++}$ from stains on hard surfaces which comprises contacting said stained surface with an effective amount of the composition of claim 1.

9. An improved process for removing $Fe^{+++}$ from stains on hard surfaces which comprises contacting said surface with an effective amount of the composition of claim 3.

* * * * *

PO-1050
(5/69)

UNITED STATES PATENT OFFICE
CERTIFICATE OF CORRECTION

Patent No. 3,721,629      Dated March 20, 1973

Inventor(s) Robert D. Goodenough

It is certified that error appears in the above-identified patent and that said Letters Patent are hereby corrected as shown below:

Col. 2, line 4, "$NaHO_4$" should be --$NaHSO_4$--.

Col. 6, line 25, in Claim 7 "CHl" should be --HCl--.

Signed and sealed this 31st day of July 1973.

(SEAL)
Attest:

EDWARD M. FLETCHER, JR.      RENE D. TEGTMEYER
Attesting Officer             Acting Commissioner of Patents